US010579284B2

(12) United States Patent
Eda et al.

(10) Patent No.: US 10,579,284 B2
(45) Date of Patent: Mar. 3, 2020

(54) FILESYSTEM ENHANCEMENTS FOR UNIFIED FILE AND OBJECT ACCESS IN AN OBJECT STORAGE CLOUD

(71) Applicant: International Business Machines Corporation, Armonk, NY (US)

(72) Inventors: Sasikanth Eda, Pune (IN); Prayas Gupta, Pune (IN); Poornima Gupte, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/612,860

(22) Filed: Jun. 2, 2017

(65) Prior Publication Data

US 2018/0349043 A1 Dec. 6, 2018

(51) Int. Cl.
*G06F 3/06* (2006.01)

(52) U.S. Cl.
CPC ........... *G06F 3/0619* (2013.01); *G06F 3/061* (2013.01); *G06F 3/067* (2013.01); *G06F 3/0643* (2013.01)

(58) Field of Classification Search
CPC .... G06F 3/0619; G06F 3/0643; G06F 3/0644; G06F 3/0665; G06F 3/0689
See application file for complete search history.

(56) References Cited

U.S. PATENT DOCUMENTS

| | | | | |
|---|---|---|---|---|
| 5,526,328 | A * | 6/1996 | Oshima | G06F 1/1626 369/13.02 |
| 8,849,759 | B2 | 9/2014 | Bestler et al. | |
| 9,098,447 | B1 * | 8/2015 | Donlan | H03M 13/15 |
| 9,916,198 | B2 | 3/2018 | Baker et al. | |
| 10,379,742 | B2 | 8/2019 | Smith et al. | |
| 2007/0208748 | A1 * | 9/2007 | Li | G06F 16/1834 |
| 2011/0029840 | A1 * | 2/2011 | Ozzie | G06F 11/1004 714/763 |
| 2012/0330894 | A1 * | 12/2012 | Slik | H04L 67/1097 707/626 |
| 2013/0132800 | A1 * | 5/2013 | Healey, Jr. | G06F 3/0607 714/769 |

(Continued)

OTHER PUBLICATIONS

Rouse, Search Storage, "Erasure Coding," Nov. 17, 2014, pp. 1, Retrieved From http://searchstorage.techtarget.com/definition/erasure-coding.

(Continued)

*Primary Examiner* — Ryan Bertram
(74) *Attorney, Agent, or Firm* — Zilka-Kotab, P.C.

(57) ABSTRACT

A computer-implemented method according to one embodiment includes identifying an erasure code storage policy for an unified file and object storage system, determining a plurality of storage disks associated with the erasure code storage policy, retrieving disk health parameters for each of the plurality of storage disks, identifying a number of available outer partition storage blocks for each of the plurality of storage disks, and determining a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

16 Claims, 8 Drawing Sheets

(56) References Cited

U.S. PATENT DOCUMENTS

| | | | |
|---|---|---|---|
| 2014/0025711 A1* | 1/2014 | Avati | G06F 16/182 |
| | | | 707/827 |
| 2015/0229339 A1* | 8/2015 | Reinart | H03M 13/373 |
| | | | 714/752 |
| 2016/0063008 A1 | 3/2016 | Benight | |
| 2016/0188407 A1 | 6/2016 | Bronnikov et al. | |
| 2016/0217039 A1 | 7/2016 | Reinart | |
| 2016/0274805 A1* | 9/2016 | Ohno | G06F 3/0619 |
| 2017/0024295 A1* | 1/2017 | Klughart | G06F 16/183 |
| 2017/0249213 A1* | 8/2017 | Slik | G06F 11/1092 |
| 2019/0377502 A1 | 12/2019 | Eda et al. | |

OTHER PUBLICATIONS

Western Digital, "Perpendicular Magnetic Recording (PMR)," 2008, pp. 1, Retrieved From http://www.wdc.com/wdproducts/library/other/2579-701185.pdf.

HGST, "Perpendicular Magnetic Recording Technology," Whitepaper, Nov. 2007, pp. 1-7, Retrieved From http://www.hgst.com/tech/techlib.nsf/techdocs/F47BF010A4D29DFD8625716C005B7F34/$file/PMR_white_paper_final.pdf.

Mearian, "WD Leapfrogs Seagate with World's Highest Capacity 10TB Helium Drive, New Flash Drives," Computerworld, Sep. 9, 2014, pp. 1-3, Retrieved From http://www.computerworld.com/article/2604311/computer-hardware/wd-leapfrogs-seagate-with-world-s-highest-capacity-10tb-helium-drive-new-flash-drives.html.

HGST, "HGST Shingled Magnetic Recording + HelioSeal® Technology," Aug. 2016, pp. 1-6, Retrieved From https://www.hgst.com/sites/default/files/resources/WP27-Shingled-Magnetic-Recording-HelioSeal-Technology.pdf.

Eda et al., U.S. Appl. No. 16/547,413, filed Aug. 21, 2019.

* cited by examiner

FILESYSTEM ENHANCEMENTS FOR UNIFIED FILE AND OBJECT ACCESS IN AN OBJECT STORAGE CLOUD

BACKGROUND

The present invention relates to data storage, and more specifically, this invention relates to storing erasure code fragments prior to performing objectization on a file.

Object storage enables the storage and management of unstructured data in the form of objects. Within this object storage, a process called objectization is performed on files within the object storage in order to facilitate synchronization between metadata of the file and metadata of the object. Erasure code storage may also be implemented within the object storage as a safety precaution. During erasure code storage, a file is broken into a plurality of erasure code fragments that are stored within the object storage. Currently, however, objectization is only performed after verifying that all erasure code fragments have been stored within object storage, which may delay object access within the object storage.

SUMMARY

A computer-implemented method according to one embodiment includes identifying an erasure code storage policy for an unified file and object storage system, determining a plurality of storage disks associated with the erasure code storage policy, retrieving disk health parameters for each of the plurality of storage disks, identifying a number of available outer partition storage blocks for each of the plurality of storage disks, and determining a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

According to another embodiment, a computer program product for unified file and unified file and object storage comprises a computer readable storage medium having program instructions embodied therewith, wherein the computer readable storage medium is not a transitory signal per se, and where the program instructions are executable by a processor to cause the processor to perform a method comprising identifying an erasure code storage policy for an unified file and object storage system, utilizing the processor, determining a plurality of storage disks associated with the erasure code storage policy, utilizing the processor, retrieving disk health parameters for each of the plurality of storage disks, utilizing the processor, identifying a number of available outer partition storage blocks for each of the plurality of storage disk, utilizing the processor, and determining, utilizing the processor, a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

A system according to another embodiment comprises a processor, and logic integrated with the processor, executable by the processor, or integrated with and executable by the processor, where the logic is configured to identify an erasure code storage policy for an unified file and object storage system, determine a plurality of storage disks associated with the erasure code storage policy, retrieve disk health parameters for each of the plurality of storage disks, identify a number of available outer partition storage blocks for each of the plurality of storage disks, and determine a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for unified file and object storage. Various embodiments provide a method to optimize a number of erasure code fragments to be stored for a file within a unified file and object storage system before initiating an objectization process on the file, based on disk health parameters and a number of outer partition storage blocks available within storage.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for unified file and object storage.

In one general embodiment, a computer-implemented method includes identifying an erasure code storage policy for an unified file and object storage system, determining a plurality of storage disks associated with the erasure code storage policy, retrieving disk health parameters for each of the plurality of storage disks, identifying a number of available outer partition storage blocks for each of the plurality of storage disks, and determining a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

In another general embodiment, a computer program product for unified file and unified file and object storage comprises a computer readable storage medium having program instructions embodied therewith, wherein the computer readable storage medium is not a transitory signal per se, and where the program instructions are executable by a processor to cause the processor to perform a method comprising identifying an erasure code storage policy for an unified file and object storage system, utilizing the processor, determining a plurality of storage disks associated with the erasure code storage policy, utilizing the processor, retrieving disk health parameters for each of the plurality of storage disks, utilizing the processor, identifying a number of available outer partition storage blocks for each of the plurality of storage disk, utilizing the processor, and determining, utilizing the processor, a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

In another general embodiment, a system comprises a processor, and logic integrated with the processor, executable by the processor, or integrated with and executable by the processor, where the logic is configured to identify an erasure code storage policy for an unified file and object storage system, determine a plurality of storage disks associated with the erasure code storage policy, retrieve disk health parameters for each of the plurality of storage disks, identify a number of available outer partition storage blocks for each of the plurality of storage disks, and determine a number of erasure code fragments to be stored for a file within the unified file and object storage system before initiating an objectization process on the file, utilizing the disk health parameters for each of the plurality of storage disks and the number of available outer partition storage blocks for each of the plurality of storage disks.

Figure 1:
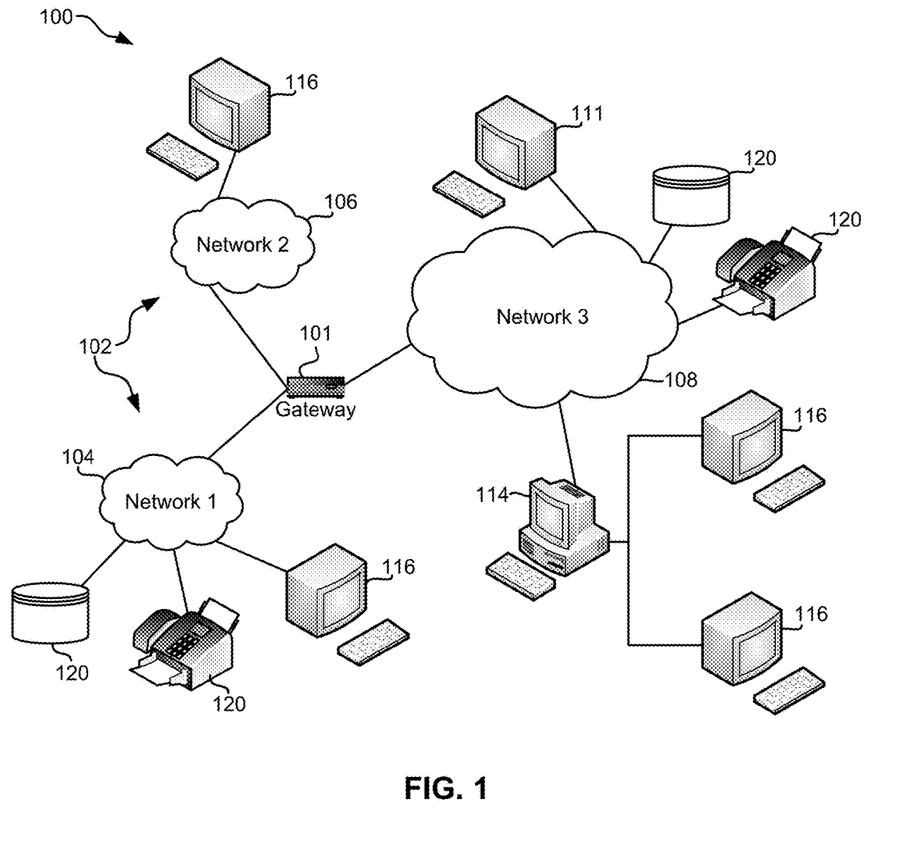
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
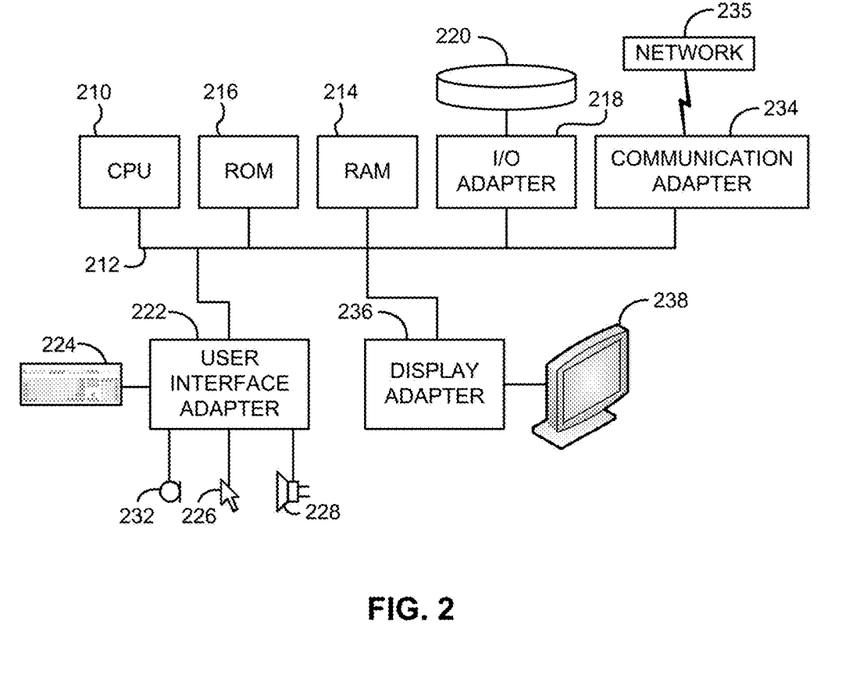
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
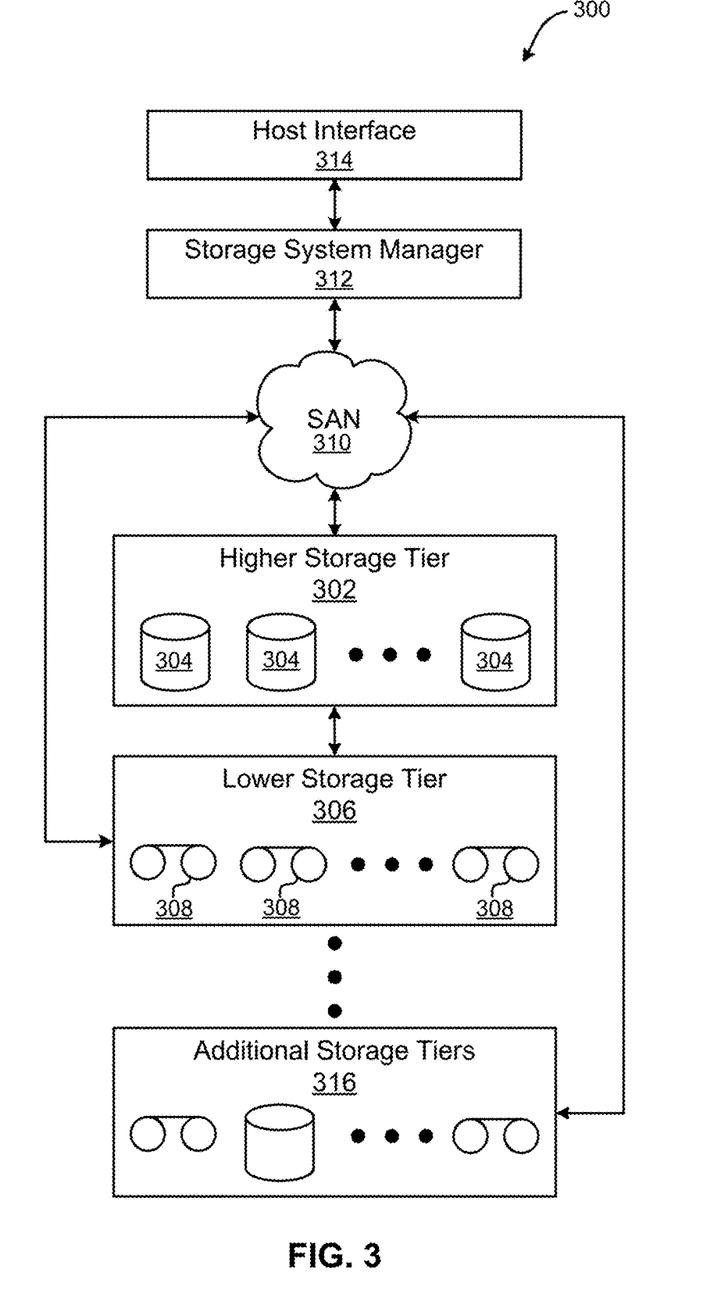
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
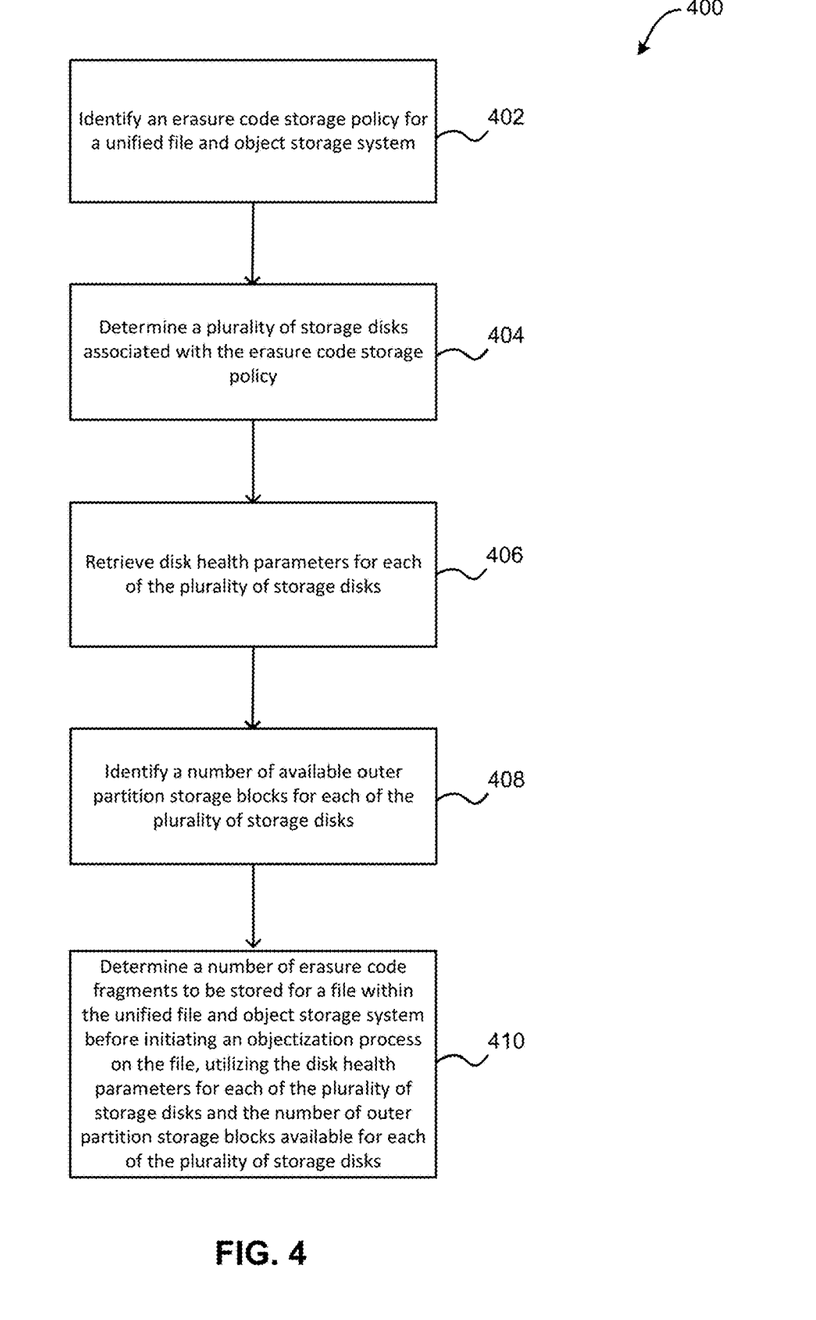
FIG. 4 illustrates a method for unified file and object storage, in accordance with one embodiment.

Now referring to FIG. 4, a flowchart of a method 400 is shown according to one embodiment. The method 400 may be performed in accordance with the present invention in any of the environments depicted in FIGS. 1-3, 6, and 7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an erasure code storage policy is identified for a unified file and object storage system. In one embodiment, the unified file and object storage system may include a unified file and object storage architecture. In another embodiment, the unified file and object storage architecture may include a plurality of storage nodes distributed within a plurality of node groups. For example, the storage nodes may include one or more proxy nodes that are used for distributed load handling and/or request handling. In another example, the storage nodes may include one or more storage nodes that write data to storage disks and storage subsystems.

Additionally, in one embodiment, the erasure code storage policy may be associated with erasure coding within the unified file and object storage system. For example, the erasure coding may include a means of data protection. In another example, the erasure coding may include breaking an instance of data (e.g. a file, etc.) into a plurality of erasure code fragments, and storing each of the plurality of erasure code fragments on storage disks within the unified file and object storage system. In yet another example, the erasure coding may enable a reconstruction of corrupted data, using all or a portion of the fragments.

Further, in one embodiment, the erasure code storage policy may indicate a minimum number of fragments necessary to reconstruct data. For example, an "X/Y" erasure code storage policy may indicate that a data file is broken into X fragments to be stored within the unified file and object storage system, and Y fragments are necessary to reconstruct the data file. In another embodiment, the unified file and object storage system may support unified file and object access. For example, the unified file and object storage system may allow the accessing of data using object as well as file interfaces.

Further still, method 400 may proceed with operation 404, where a plurality of storage disks associated with the erasure code storage policy are determined. In one embodiment, each of the plurality of storage disks may include a hard disk drive (HDD). In another embodiment, each of the plurality of storage disks may be located within the unified file and object storage system.

Also, in one embodiment, each of the plurality of storage disks may be located within a storage pool of the unified file and object storage system, where the storage pool is associated with the erasure code storage policy. For example, each storage disk that supports the erasure code storage policy may have an associated tag indicating the support. In this way, identifying the plurality of storage disks may include identifying the associated tag of each of the plurality of storage disks. In another example, a first plurality of storage disks may support a first erasure code storage policy and may be located within a first storage pool of the unified file and object storage system, while a second plurality of storage disks may support a second erasure code storage policy and may be located within a second storage pool of the unified file and object storage system.

In addition, method 400 may proceed with operation 406, where disk health parameters are retrieved for each of the plurality of storage disks. In one embodiment, retrieving the disk health parameters may include requesting disk health parameters from a monitoring system included in each of the storage disks. For example, the monitoring system may include a self-monitoring, analysis and reporting technology (SMART) system.

Furthermore, in one embodiment, the health parameters may include any data associated with a physical health of a storage disk. For example, the health parameters may include one or more of a read error rate, a seek error rate, a reallocated sectors count, a throughput performance, a spin retry count, a reported number of uncorrectable errors, a command timeout, etc. In another embodiment, enclosure numbers and/or disk identifiers may be identified for each of the plurality of storage disks in order to identify any disk replacements.

Further still, method 400 may proceed with operation 408, where a number of available outer partition storage blocks are identified for each of the plurality of storage disks. In one embodiment, the outer partition storage blocks may include storage blocks located within an outer partition of a storage disk. For example, the outer partition storage blocks may be located at a predetermined area within the storage disk (e.g., each block within the storage disk may be labeled as an outer partition storage block or an inner partition storage block).

Also, in one embodiment, the outer partition storage blocks may be located further from the spindle of the storage disk than inner partition storage blocks. In another embodiment, the outer partition storage blocks may be located at or beyond a predetermined distance from the spindle of the storage disk.

Additionally, in one embodiment, identifying the number of available outer partition storage blocks may include determining a number of storage blocks necessary to store an erasure code fragment within a storage disk. In another embodiment, identifying the number of available outer partition storage blocks may include determining, for each of the storage disks, whether the number of outer partition storage blocks available for the storage disk is equal to or greater than the number of storage blocks necessary to store the erasure code fragment within the storage disk.

Further, method 400 may proceed with operation 410, where a number of erasure code fragments to be stored for a file within the unified file and object storage system before initiating an objectization process on the file is determined, utilizing the disk health parameters for each of the plurality of storage disks and the number of outer partition storage blocks available for each of the plurality of storage disks. In one embodiment, the objectization process may include the conversion of the file to an object. For example, the file may be received from a file interface (e.g., POSIX®, NFS®, CIFS®, etc.), and the object may include a standard format of the unified file and object storage system.

Further still, in one embodiment, the objectization process may ensure synchronization between metadata of the file and metadata of the object at a predetermined time interval. For example, the objectization process may enable an accurate listing of the object within the unified file and object storage system. In another embodiment, the objectization process may include performing a plurality of steps on the file. For example, the objectization process may include calculating an Etag, a creation time, and a size of the object. In another example, the objectization process may include updating object details to a container database. In yet another example, the objectization process may include updating xattr data and metadata of the object using the updated object details.

Also, in one embodiment, the file may be broken into a plurality of erasure code fragments. For example, each of the plurality of erasure code fragments may be stored on storage disks within the unified file and object storage system. In another embodiment, the number of erasure code fragments may include a subset of the total plurality of erasure code fragments. For example, the subset may include a minimum number of erasure code fragments that need to be stored on storage disks within the unified file and object storage system in order to perform successful objectization for the file.

In addition, in one embodiment, disk health parameters indicating that the one or more storage disks are healthy may reduce a number of erasure code fragments to be stored before initiating the objectization process, when compared to disk health parameters indicating that the one or more storage disks are unhealthy. In another embodiment, a greater number of available outer partition storage blocks may reduce a number of erasure code fragments to be stored before initiating the objectization process, when compared to a lesser number of available outer partition storage blocks.

In this way, a reduced number of erasure code fragments may need to be stored within the unified file and object storage system for a file before objectization may be successfully performed on the file. This may improve the performance of the objectization process, reduce power consumption of the unified file and object storage system, expedite object access within the unified file and object storage system, etc.

Figure 5:
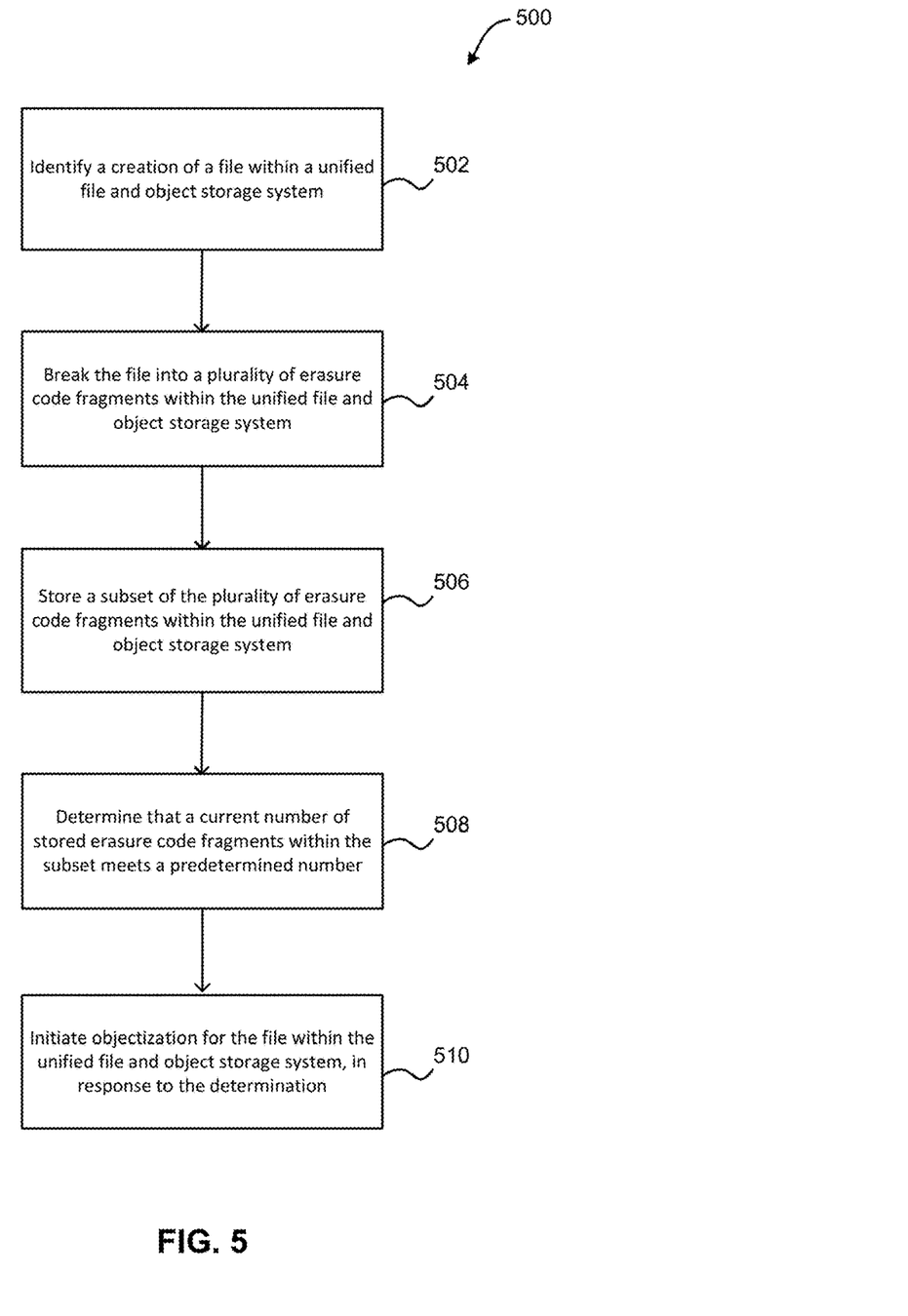
FIG. 5 illustrates a method for initiating objectization after erasure code fragment storage, in accordance with one embodiment.

Now referring to FIG. 5, a flowchart of a method 500 for initiating objectization after erasure code fragment storage is shown according to one embodiment. The method 500 may be performed in accordance with the present invention in any of the environments depicted in FIGS. 1-3, 6, and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a creation of a file is identified within a unified file and object storage system. In one embodiment, the file may be received by the unified file and object storage system. In another embodiment, the file may be created within the unified file and object storage system. In yet another embodiment, the file may be created utilizing a file interface (e.g., POSIX®, NFS®, CIFS®, etc.).

Additionally, method 500 may proceed with operation 504, where the file is broken into a plurality of erasure code fragments within the unified file and object storage system. In one embodiment, each of the plurality of erasure code fragments may have a predetermined size. In another embodiment, each of the plurality of erasure code fragments may have the same size.

In one embodiment, erasure coding may include a method of data protection in which data is broken into fragments. These fragments may be expanded and encoded with a configurable number of redundant pieces of data, and may be stored across different locations, such as disks, storage nodes or geographical locations. One goal of erasure coding may be to enable data that becomes corrupted to be reconstructed by using information about the data that is stored elsewhere in the array—or even in another location.

Further, method 500 may proceed with operation 506, where a subset of the plurality of erasure code fragments are stored within the unified file and object storage system. In one embodiment, each of the erasure code fragments within the subset may be sent to one of a plurality of storage disks of the unified file and object storage system via a filesystem layer of the unified file and object storage system.

In one embodiment, shingled recording may be utilized to store the subset of the plurality of erasure code fragments within the unified file and object storage system. For example, conventional hard disk drives may record data by writing non-overlapping magnetic tracks parallel to each other, while shingled recording may write new tracks that overlap part of the previously written magnetic track, which may leave the previous track thinner and may allow for higher track density. In this way, the tracks may partially overlap (similar to roof shingles).

Further still, method 500 may proceed with operation 508, where it is determined that a current number of stored erasure code fragments within the subset meets a predetermined number. In one embodiment, an acknowledgement may be received from each of a plurality of disks in response to an erasure code fragment being stored on the disk. In another embodiment, the total number of received acknowledgements may be compared to the predetermined number.

In yet another embodiment, a count may be incremented as each acknowledgement is received, and the count may be compared to the predetermined number.

Also, in one embodiment, the predetermined number may be calculated utilizing an erasure code storage policy, disk health parameters for each of a plurality of storage disks within the unified file and object storage system, and a number of outer partition storage blocks available for each of the plurality of storage disks within the unified file and object storage system.

In addition, method 500 may proceed with operation 510, where objectization for the file is initiated within the unified file and object storage system, in response to the determining. In one embodiment, an object_close( ) event notification may be sent to an objectizer process within the unified file and object storage system, in response to the determining. In another embodiment, the receipt of the object_close( ) event notification may initiate the objectization of the file by the objectizer process.

In one embodiment, objectization may include a method to convert files ingested from the file interface (e.g., via POSIX®, NFS®, CIFS®, etc.) to objects (which can be consumed by an object store) on a unified file and object access enabled namespace. When new files are added from the file interface, they may to be exposed to the object store databases in order to have a correct listing and statistics. The objectization process may ensure synchronization between the file metadata and the object metadata at a predefined time interval, which in turn may ensure an accurate listing. This methodology may be used in setups where data is ingested using legacy file applications and needs to be stored and accessed over the cloud using the object interface.

Figure 6:
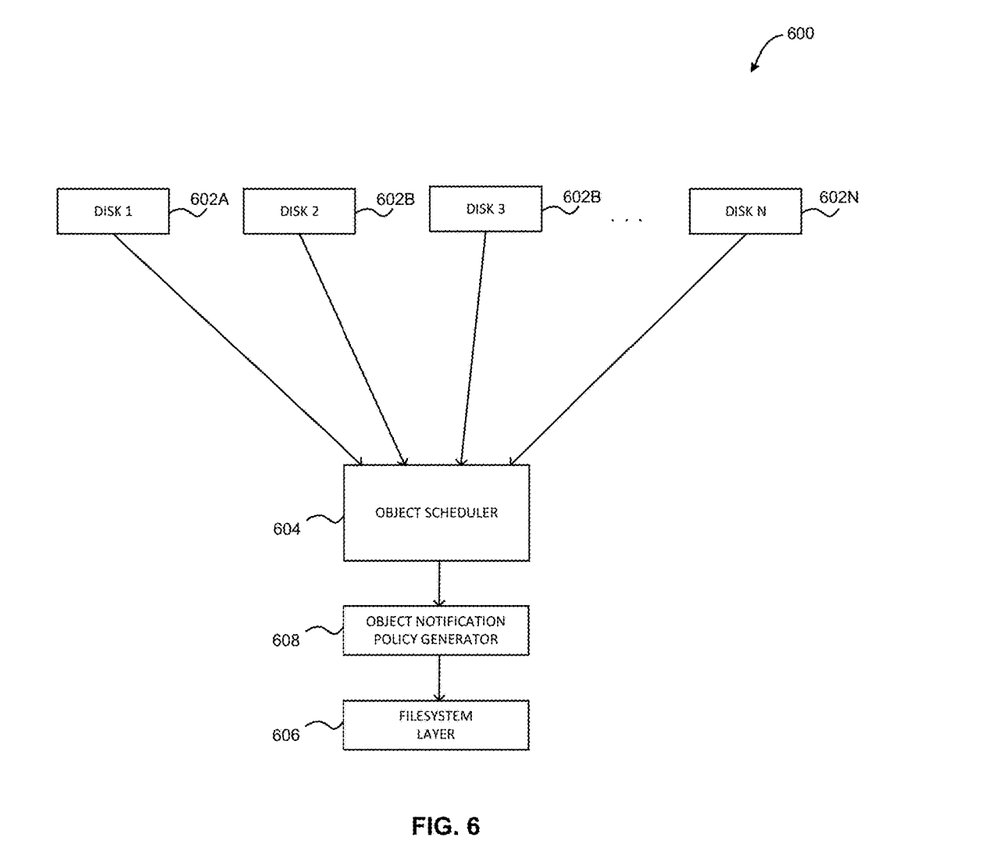
FIG. 6 illustrates an exemplary framework for monitoring data associated with a plurality of geo-dispersed disk drives, in accordance with one embodiment.

FIG. 6 illustrates an exemplary framework 600 for monitoring data associated with a plurality of geo-dispersed disk drives 602A-N. As shown in FIG. 6, an object scheduler 604 is in communication with the plurality of geo-dispersed disk drives 602A-N. In one embodiment, each of the plurality of geo-dispersed disk drives 602A-N may include a hard disk drive (HDD). In another embodiment, the plurality of geo-dispersed disk drives 602A-N may be located in different physical locations.

Additionally, in one embodiment, each of the geo-dispersed disk drives 602A-N may be determined to be associated with an erasure code storage policy. In another embodiment, each of the geo-dispersed disk drives 602A-N may be associated with a storage pool that supports the erasure code storage policy. In yet another embodiment, each of the geo-dispersed disk drives 602A-N may have an associated tag indicating support for the erasure code storage policy.

Further, in one embodiment, the object scheduler 604 may monitor each of the geo-dispersed disk drives 602A-N. In another embodiment, the object scheduler 604 may request data from each of the geo-dispersed disk drives 602A-N. For example, the object scheduler 604 may request one or more disk health parameters, as well as a number of available outer partition storage blocks, from each of the geo-dispersed disk drives 602A-N. In yet another embodiment, the object scheduler 604 may store the requested data.

Table 1 illustrates exemplary disk health parameters that may be retrieved from one or more of the geo-dispersed disk drives 602A-N, in accordance with one embodiment. Of course, it should be noted that the exemplary disk health parameters shown in Table 1 are set forth for illustrative purposes only, and thus should not be construed as limiting in any manner.

TABLE 1

Storage_pool1 = {policy: 16/9; disk1: {raw_read_error_rate: '1', - - -, throughtput_performance: '500'}, disk2: {raw_read_error_rate: '10', - - -,
throughtput_performance: '5'}, disk3: {raw_read_error_rate: '100', - - -,
throughtput_performance: '100'}, - - - disk16: {raw_read_error_rate: '25567', - - -,
throughtput_performance: '50'} }
Storage_pool2 = {policy: 12/8; disk1: {raw_read_error_rate: '0', - - -,
throughtput_performance: '1000'}, disk2: { raw_read_error_rate: '1', - - -,
throughtput_performance: '50'}, disk3: { raw_read_error_rate: '67776', - - -,
throughtput_performance: '0'}, - - - disk12: {raw_read_error_rate: '100', - - -,
throughtput_performance: '500'} }

Table 2 illustrates exemplary available outer partition storage blocks that may be retrieved from one or more of the geo-dispersed disk drives 602A-N, in accordance with one embodiment. Of course, it should be noted that the exemplary available outer partition storage blocks shown in Table 2 are set forth for illustrative purposes only, and thus should not be construed as limiting in any manner.

TABLE 2

Storage_pool1 = {policy: 16/9; outer_tracks: {disk1: 'yes', disk2: 'no', - - -, disk16: 'yes'}}
Storage_pool2 = {policy: 12/8; outer_tracks: { disk1: 'no', disk2: 'no', - - -, disk12: 'yes'}}

As shown in Table 2, for one or more of the plurality of geo-dispersed disk drives 602A-N, an availability check may calculate the number of blocks needed to write erasure code fragments corresponding to an object and may check for the number of available OUTER track blocks. In one embodiment, there may be a significant speed gap between the outer partition vs. the inner partition within a storage disk (e.g., a speed ratio may be 100/60 (outer/inner), such that a drive that is capable of 120 MB/sec on the outer tracks might yield 72 MB/sec on the inner tracks).

Further still, an object notification policy generator 608 is in communication with the object scheduler 604. In one embodiment, the object notification policy generator 608 may access the data from each of the geo-dispersed disk drives 602A-N that was retrieved by the object scheduler 604 (e.g., the one or more disk health parameters, the number of available outer partition storage blocks, etc.). The object notification policy generator 608 may then use the accessed data to determine an object notification policy.

In one embodiment, the object notification policy may indicate a threshold number of erasure code fragments that need to be stored by the plurality of geo-dispersed disk drives 602A-N for a file within the unified file and object storage system before initiating an objectization process on the file through the filesystem layer 606. For example, based on the above collected details, an algorithm may first confirm that the namespace is used for unified and object workload, and in response to such confirmation, an objectization notification policy may dynamically determine a number of erasure code fragments that are sufficient to perform objectization (e.g., unified file and object access) based on the reliability of disks calculated via SMART parameters and an availability of OUTER disk partitions.

Figure 7:
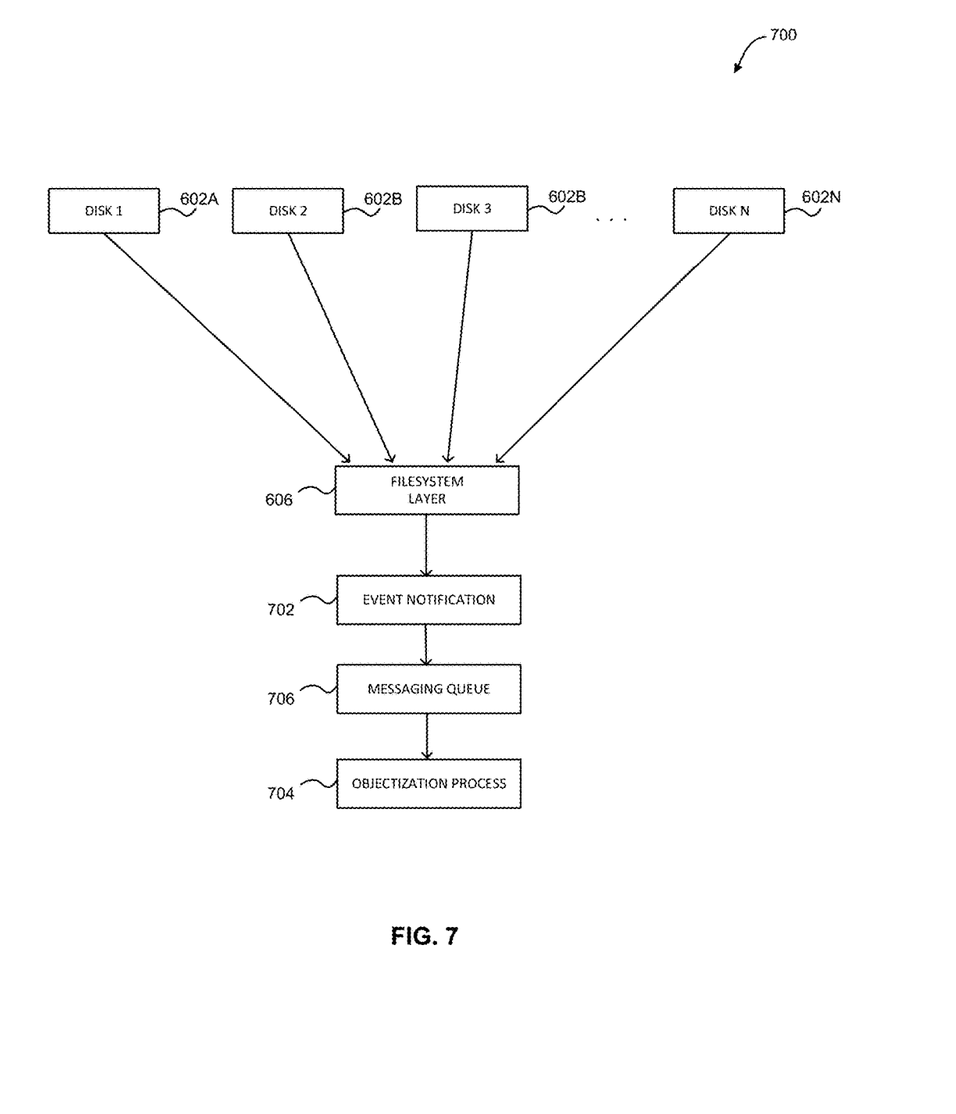
FIG. 7 illustrates an exemplary framework for sending an event notification to an objectization process, in accordance with one embodiment.

FIG. 7 illustrates an exemplary framework 700 for sending an event notification 702 to an objectization process 704 via a messaging queue 706, according to one embodiment. As shown in FIG. 7, a plurality of geo-dispersed disk drives 602A-N is in communication with the objectization process 704 via a filesystem layer 606. When a file is created within the framework, the file may be fragmented into erasure code fragments, and the erasure code fragments may be stored in one or more of the plurality of geo-dispersed disk drives 602A-N.

As the one or more geo-dispersed disk drives 602A-N successfully store an erasure code fragment of the file, a count may be increased. The count may be compared to a threshold number of erasure code fragments that need to be stored by the plurality of geo-dispersed disk drives 602A-N for a file within the unified file and object storage system before initiating an objectization process on the file through the filesystem layer 606.

Once the count equals the threshold number, an object_close( ) event notification 702 may be sent to a messaging queue 706. The messaging queue 706 may feed object_close( ) event notifications to the objectization process 704. When the object_close( ) event notification is received by the objectization process 704 for the file, the objectization process 704 may convert the object into a file.

In this way, the object_lose( ) event notification may be sent to the messaging queue when the count meets the threshold, instead of when all erasure code fragments are stored in the plurality of geo-dispersed disk drives 602A-N. This may increase a performance of the exemplary framework 700 by reducing a time to complete objectization for a file.

In one embodiment, for every new incoming object PUT request, the objectization notification policy may be based on the calculated reliable erasure code fragments. Such policy may be greater than an erasure code reconstruction factor and may be less than a full amount of erasure code fragments. Upon successful writes of the calculated reliable erasure code fragments, the algorithm may initiate an object_ close ( ) from the filesystem to an application (e.g., the objectizer process, etc.). Upon receiving an object_close ( ) message, the objectizer process may trigger the rest of the tasks involved in enabling object access to a file created via a file interface (e.g., POSIX®, NFS®, CIFS®, etc.).

In another embodiment, consider a 16/9 policy, where a number of fragments needed for erasure code reconstruction at any given point of time is 7. The objectization notification policy based on the SMART and availably of outer tracks may determine 10 as the reliable count. Upon successful write completion of 10 erasure code fragments, the algorithm may send an object_close ( ) acknowledgement from the filesystem to an objectizer process.

Upon receiving the object_close ( ) message, the objectizer process may trigger the remaining tasks involved in enabling object access to a file created via a file interface (e.g., POSIX®, NFS®, CIFS®, etc.). With this approach, the objectizer process may be initiated after 10 successful erasure code fragments and may not need to wait until 16 erasure code fragments are written, which may enable faster object access for files created via the file interface.

Table 3 illustrates exemplary operations that enable object access for a created file inode, in accordance with one embodiment. Of course, it should be noted that the exemplary operations shown in Table 3 are set forth for illustrative purposes only, and thus should not be construed as limiting in any manner.

TABLE 3

1. Namespace scan to identify the new inode creation and its absolute path or a filesystem clustered notification service which identifies and notifies about new inode creation along with its path.
2. Obtained inode, path information is pushed to a messaging queue and where a consumer process is defined/listens to the messaging queue. The consumer process responsibility is to pull the inode, path details and perform Step-3 and Step-4.
3. Updating the respective container and account databases with the details (like name, size, ETag, ACL's, creation time, content-type, modified date etc.) of newly created file (via file interface).
4. Appending the calculated object extended attributes (xattr's like - "X-Object-Meta-Mtime", "X-Object-Content-Type", "X-Object-Size", "X-Object-ETag") to the newly created file (via file interface).

As shown in Table 3, for this kind of implementation, when applied in a geo-dispersed erasure coded cluster with billions of files, the inode scan and the above mentioned tasks may require much more execution time which may directly affect the amount of time to enable object access. This execution time may be reduced by utilizing a comparison to the threshold number of erasure code fragments.

Figure 8:
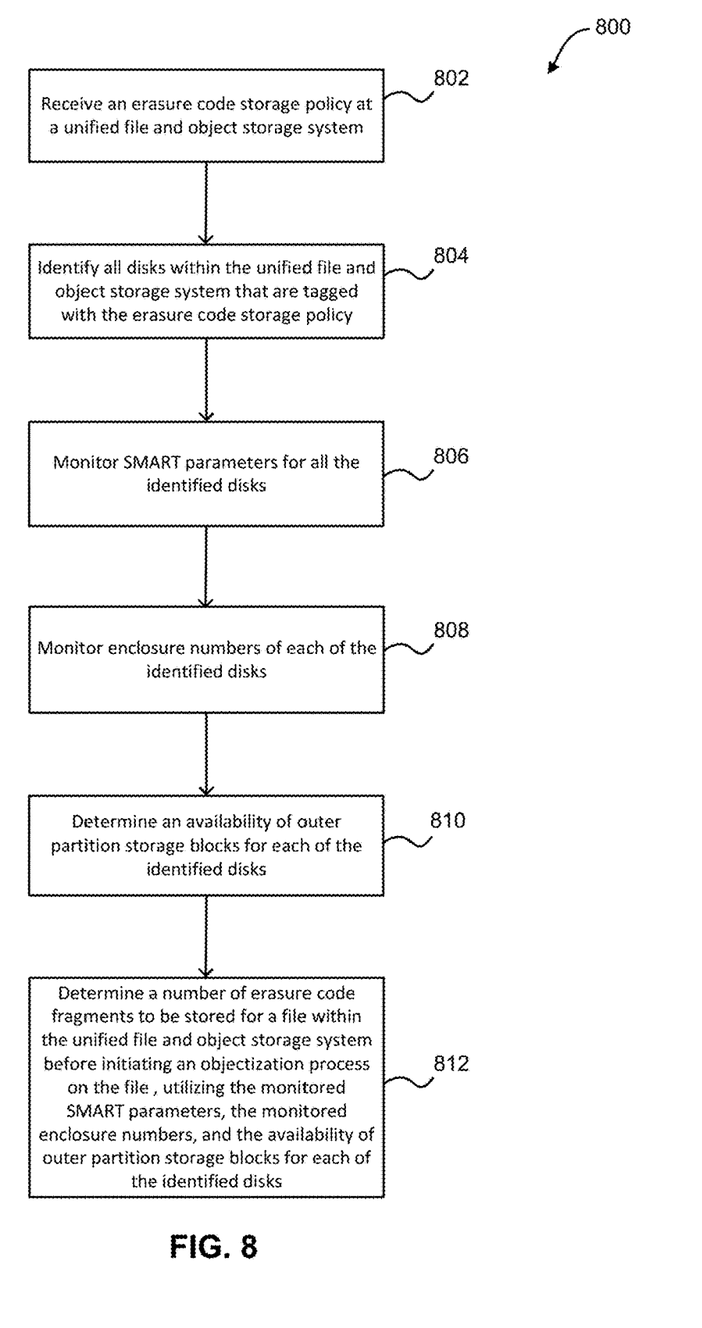
FIG. 8 illustrates a method for identifying disk data, in accordance with one embodiment.

Now referring to FIG. 8, a flowchart of a method 800 for identifying disk data is shown according to one embodiment. The method 800 may be performed in accordance with the present invention in any of the environments depicted in FIGS. 1-3, 6, and 7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an erasure code storage policy is received at an unified file and object storage system. Additionally, method 800 may proceed with operation 804, where all disks within the unified file and object storage system that are tagged with the erasure code storage policy are identified. For example, each disk within the unified file and object storage system may include a tag indicating an erasure code storage policy that the disk participates in.

Further, method 800 may proceed with operation 806, where SMART parameters are monitored for all the identified disks. Further still, method 800 may proceed with operation 808, where enclosure numbers of each of the identified disks are monitored. In one embodiment, the enclosure numbers may be monitored to identify any replacement of one or more of the identified disks.

Also, method 800 may proceed with operation 810, where an availability of outer partition storage blocks are determined for each of the identified disks. In addition, method 800 may proceed with operation 812, where a number of erasure code fragments to be stored for a file within the unified file and object storage system before initiating an objectization process on the file is determined, utilizing the monitored SMART parameters, the monitored enclosure numbers, and the availability of outer partition storage blocks for each of the identified disks.

In this way, an algorithm in an erasure coded unified file and object storage environment may dynamically determine the number of reliable erasure code fragments that are sufficient for objectization based on disk SMART parameters and availability of OUTER disk partitions. For example, in a 16/9 erasure code cluster, the objectization process may originally be triggered only after the 16 erasure code fragments are written successfully, but through implementation of the above developments, the objectization process may be triggered after successful 11 write completion, where the 11 fragments are decided based on the disk health and outer track availability for writing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying an erasure code storage policy for a unified file and object storage system;
    determining a plurality of storage disks associated with the erasure code storage policy;
    retrieving disk health parameters for each of the plurality of storage disks;
    identifying a number of available outer partition storage blocks for each of the plurality of storage disks, where the outer partition storage blocks are located at or beyond a predetermined distance from a spindle of the storage disk; and
    determining a number of erasure code fragments to be stored for a file within the unified file and object storage system before initiating an objectization process on the file, based on the disk health parameters for each of the plurality of storage disks and the number of available outer partition storage blocks for each of the plurality of storage disks.

2. The computer-implemented method of claim 1, wherein each of the plurality of storage disks includes a hard disk drive (HDD) located within the unified file and object storage system.

3. The computer-implemented method of claim 1, wherein each of the plurality of storage disks is located within a storage pool of the unified file and object storage system, where the storage pool is associated with the erasure code storage policy.

4. The computer-implemented method of claim 1, wherein retrieving the disk health parameters includes requesting disk health parameters from a monitoring system included in each of the storage disks, where the monitoring system includes a self-monitoring, analysis and reporting technology (SMART) system.

5. The computer-implemented method of claim 1, wherein the disk health parameters are selected from a group consisting of a read error rate, a seek error rate, a reallocated sectors count, a throughput performance, a spin retry count, a reported number of uncorrectable errors, and a command timeout.

6. The computer-implemented method of claim 1, wherein identifying the number of available outer partition storage blocks includes determining a number of storage blocks necessary to store an erasure code fragment within a storage disk, and determining, for each of the storage disks, whether a number of outer partition storage blocks available for the storage disk is equal to or greater than the number of storage blocks necessary to store the erasure code fragment within the storage disk.

7. The computer-implemented method of claim 1, wherein the number of erasure code fragments includes a subset of a total plurality of erasure code fragments, where the subset includes a minimum number of erasure code fragments to be stored on the plurality of storage disks within the unified file and object storage system in order to perform the objectization process for the file.

8. The computer-implemented method of claim 1, wherein a greater number of available outer partition storage blocks reduces a number of erasure code fragments to be stored before initiating the objectization process, when compared to a lesser number of available outer partition storage blocks.

9. A computer program product for unified file and unified file and object storage, the computer program product comprising a computer readable storage medium having program instructions embodied therewith, wherein the computer readable storage medium is not a transitory signal per se, the program instructions executable by a processor to cause the processor to perform a method comprising:

identifying an erasure code storage policy for a unified file and object storage system, utilizing the processor;

determining a plurality of storage disks associated with the erasure code storage policy, utilizing the processor;

retrieving disk health parameters for each of the plurality of storage disks, utilizing the processor;

identifying a number of available outer partition storage blocks for each of the plurality of storage disk, utilizing the processor, where the outer partition storage blocks are located at or beyond a predetermined distance from a spindle of the storage disk; and determining, utilizing the processor, a number of erasure code fragments to be stored for a file within the unified file and object storage system before initiating an objectization process on the file, based on the disk health parameters for each of the plurality of storage disks and the number of available outer partition storage blocks for each of the plurality of storage disks.

10. The computer program product of claim 9, wherein each of the plurality of storage disks includes a hard disk drive (HDD) located within the unified file and object storage system.

11. The computer program product of claim 9, wherein each of the plurality of storage disks is located within a storage pool of the unified file and object storage system, where the storage pool is associated with the erasure code storage policy.

12. The computer program product of claim 9, wherein retrieving the disk health parameters includes requesting disk health parameters from a monitoring system included in each of the storage disks, where the monitoring system includes a self-monitoring, analysis and reporting technology (SMART) system.

13. The computer program product of claim 9, wherein the disk health parameters are selected from a group consisting of a read error rate, a seek error rate, a reallocated sectors count, a throughput performance, a spin retry count, a reported number of uncorrectable errors, and a command timeout.

14. The computer program product of claim 9, wherein identifying the number of available outer partition storage blocks includes determining a number of storage blocks necessary to store an erasure code fragment within a storage disk, and determining, for each of the storage disks, whether a number of outer partition storage blocks available for the storage disk is equal to or greater than the number of storage blocks necessary to store the erasure code fragment within the storage disk.

15. The computer program product of claim 9, wherein the number of erasure code fragments includes a subset of a total plurality of erasure code fragments, where the subset includes a minimum number of erasure code fragments to be stored on the plurality of storage disks within the unified file and object storage system in order to perform the objectization process for the file.

16. A system, comprising:
a processor; and
logic integrated with the processor, executable by the processor, or integrated with and executable by the processor, the logic being configured to:
identify an erasure code storage policy for a unified file and object storage system;
determine a plurality of storage disks associated with the erasure code storage policy;
retrieve disk health parameters for each of the plurality of storage disks;
identify a number of available outer partition storage blocks for each of the plurality of storage disks, where the outer partition storage blocks are located at or beyond a predetermined distance from a spindle of the storage disk; and
determine a number of erasure code fragments to be stored for a file within the unified file and object storage system before initiating an objectization process on the file, based on the disk health parameters for each of the plurality of storage disks and the number of available outer partition storage blocks for each of the plurality of storage disks.

* * * * *